United States Patent
Maurer (10) Patent No.: US 7,006,963 B1
(45) Date of Patent: Feb. 28, 2006

(54) INTELLIGENT WORKSTATION SIMULATION-SIMULATION AT PROTOCOL STACK LEVEL 2

(75) Inventor: Max M. Maurer, Gardiner, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/516,708

(22) Filed: Mar. 2, 2000

(51) Int. Cl.
G06F 9/44 (2006.01)
G06F 9/45 (2006.01)
G06F 9/455 (2006.01)

(52) U.S. Cl. .............................. 703/21; 703/22; 703/23; 703/27; 714/39; 714/32; 702/186

(58) Field of Classification Search .................. 703/21, 703/22, 23, 24, 27; 709/223, 227, 220, 221, 709/222; 714/4, 32, 33, 39; 702/122, 179, 702/182, 193, 186
See application file for complete search history.

(56) References Cited

U.S. PATENT DOCUMENTS

| 5,440,719 | A |   | 8/1995  | Hanes et al. |
|-----------|---|---|---------|--------------|
| 5,548,723 | A |   | 8/1996  | Pettus |
| 5,594,921 | A |   | 1/1997  | Pettus |
| 5,621,726 | A | * | 4/1997  | Murakimi .................... 370/255 |
| 5,680,585 | A | * | 10/1997 | Bruell .......................... 703/26 |
| 5,724,510 | A | * | 3/1998  | Arndt et al. ................ 709/220 |
| 5,732,213 | A | * | 3/1998  | Gessel et al. ............... 709/224 |
| 5,754,831 | A |   | 5/1998  | Berman |
| 5,758,087 | A |   | 5/1998  | Aaker et al. |
| 5,761,486 | A |   | 6/1998  | Watanabe et al. |
| 5,774,695 | A | * | 6/1998  | Autrey et al. ................. 703/26 |
| 5,784,591 | A |   | 7/1998  | Kageshima |
| 5,822,563 | A |   | 10/1998 | Sitbon et al. |
| 5,838,919 | A | * | 11/1998 | Schwaller et al. .......... 709/224 |
| 5,862,362 | A | * | 1/1999  | Somasegar et al. ........... 703/21 |
| 5,881,237 | A |   | 3/1999  | Schwaller et al. |
| 5,881,269 | A |   | 3/1999  | Dobbelstein |
| 5,889,954 | A | * | 3/1999  | Gessel et al. ................ 709/223 |
| 6,167,534 | A | * | 12/2000 | Straathof et al. ............. 714/38 |
| 6,233,619 | B1 | * | 5/2001  | Narisi et al. ................ 709/230 |
| 6,243,832 | B1 | * | 6/2001  | Eckes et al. .................. 714/33 |
| 6,314,531 | B1 | * | 11/2001 | Kram ........................... 714/38 |
| 6,549,882 | B1 | * | 4/2003  | Chen et al. .................. 703/21 |

FOREIGN PATENT DOCUMENTS

WO    WO97/35406    9/1997

* cited by examiner

Primary Examiner—W. Thomson
(74) Attorney, Agent, or Firm—Scully, Scott, Murphy & Presser; William A. Kinnaman, Jr.

(57) ABSTRACT

A general purpose simulator providing a high fidelity simulation performs the simulation at level 2, the data link layer of the protocol stack level where each individual client has a unique client address. The unique client address emulated by the simulator is inserted into a data frame at the data link layer of a protocol stack before the data frame is transmitted on the communications channel. Simulation at level 3 is also performed by inserting level 3 network identifier to emulated remote multiple clients. The simulator of the present invention may be run at a workstation residing connected to a server servicing the simulated client requests. The simulator also may be run on a host computer connected to a server via a communications device. Additionally, the simulator may also be run on the same system as the server.

16 Claims, 7 Drawing Sheets

FIG. 3
(PRIOR ART)
TCP/IP PACKET ELEMENTS

INTELLIGENT WORKSTATION SIMULATION-SIMULATION AT PROTOCOL STACK LEVEL 2

This application is related to U.S. patent application Ser. No. 09/517,534, entitled "INTELLIGENT WORKSTATION SIMULATION GENERALIZED LAN FRAME GENERATION SIMULATION STRUCTURE" filed on Mar. 2, 2000, and U.S. patent application Ser. No. 09/517,465, entitled "INTELLIGENT WORKSTATION SIMULATION—CLIENT VIRTUALIZATION" filed on Mar. 2, 2000, both of which are incorporated herein in their entirety by reference thereto.

DESCRIPTION

TECHNICAL FIELD OF THE INVENTION

The present invention relates generally to a simulation method and system for testing computer networks, and more particularly to a method and system for simulating clients workstations at protocol stack level 2, the data link layer, in the layered network protocols.

BACKGROUND OF THE INVENTION

Computers and computer networks currently provide important advantages to enterprises and individuals in today's society. Moreover, with the advent and ensuing popularity of the Internet and the World Wide Web ("Web"), there is a tremendous increase in volume and usage of networked computer systems. Consequently, the explosive growth of computer networks has necessitated a need for larger servers to handle the network traffic. Presently, different implementation paradigms are available for handling this increase in volume. For example, some developers in the computer industry are implementing larger single servers to handle the network traffic while others are including a greater number of duplicated, relatively small servers to handle the increase in the network traffic volume.

Typically, as part of a development cycle, computer systems and software applications are tested by utilizing a simulation test tool, designed to emulate a real run time environment in order to test whether the specific computer system or application meets the various design criteria. In both of the above-described server implementations for meeting the high demand of network traffic, a complete and thorough test requires that the servicing computer, e.g., a server comprising a single machine or multiple machines, be tested at full load. Failure to execute a complete test inevitably results in a failure in the system when a full load is eventually experienced during the run-time.

Accordingly, to effectively test large and complex distributed applications and/or server applications, simulation of a realistically large client base is needed. Currently existing simulation tools provide simulation at application level. However, simulation at the application level yields an application specific simulator. Simulation at the port level is an improvement but still fails to exercise many client-specific paths in the system under test. Thus, a general purpose simulator that also seeks to provide a high fidelity simulation, for example, a simulation at level 2, the data link layer of the protocol stack is highly desirable. The data link layer is the lowest protocol stack level where each individual client has a unique client address.

Figure 1:
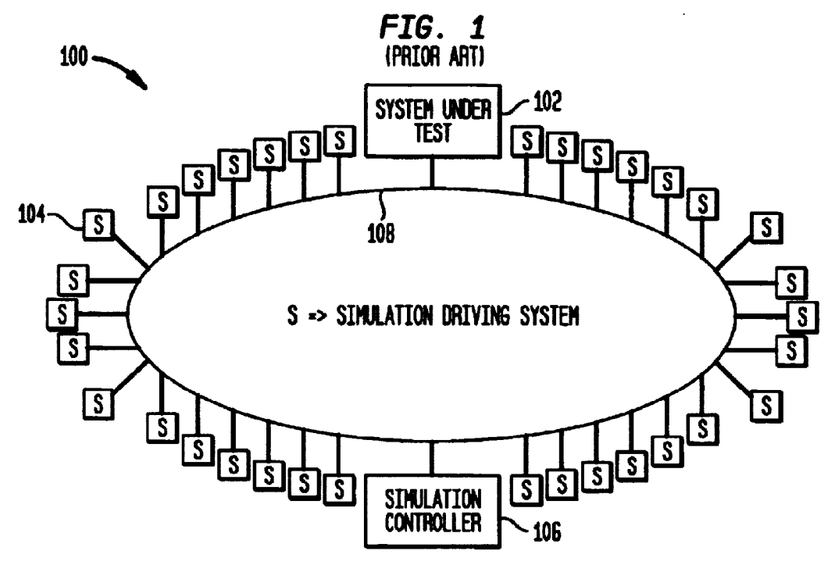
FIG. 1 is a diagram of a typical simulator in the prior art.

Other simulators are currently available for testing computer networks to withstand a large volume of traffic. FIG. 1 is a diagram 100 illustrating a typical prior art simulation setup. The serving system, i.e., a system under test 102 is driven by a set of simulation driving systems, S 104. These driving systems 104 are controlled by a central machine, simulation controller 106. All of these machines share a common connection medium 108 such as a local area network or LAN. A plurality of such configurations may be present in order to achieve the total bandwidth necessary to drive the serving system. There may be multiple controlling systems or the controlling system may have connections to multiple LANs.

Typically, the existing prior art simulators fall into two broad categories: 1) keystroke stuffers; and 2) protocol exercisers. A "keystroke stuffer" utilizes the actual application on the driving client. The driving vehicle is a program which retrieves stored scripts of keystrokes, mouse movements, and/or other user inputs to provide input to the actual client application to drive the application. The application then directs the traffic through a client protocol stack to the system under test 102.

Figure 2:
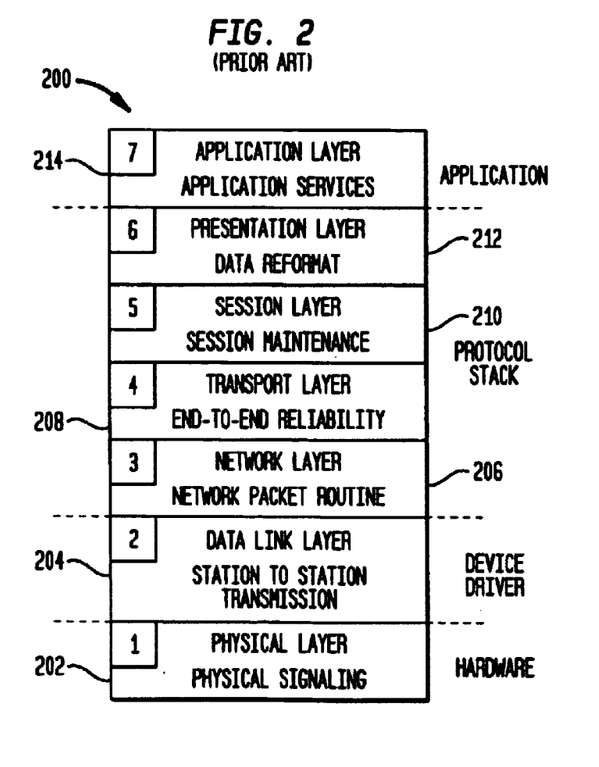
FIG. 2 is a diagram of the seven layer OSI protocol stack showing the basic functions of each layer.

FIG. 2 is a diagram of the seven layer Open Systems Interconnection ("OSI") protocol stack model. Each of the layers represents a function that must be performed to effect communication between different machines. The lowest layer in the model is the physical layer 202. The functions within the physical layer 202 include setting up, maintaining, and deactivating physical circuits between systems. The most notable physical layer interfaces include IEEE 802.2 and IEEE 802.3. The next layer, i.e., layer 2, in the OSI model is the data link layer 204, which is responsible for transferring data over the physical circuits or the channel between systems. The functions of the data link layer 204 include dividing data into frames to transfer the frames to another system across the physical medium. The data link layer provides for the synchronization of data to delimit the flow of bits from the physical layer. The data link is a point-to-point link between two devices that are directly connected together.

The next layer, layer 3, is the network layer 206. The network layer 206 provides internetwork services such as the network routing and the communications between networks. The network layer 206 handles multiple point-to-point links in the case where frames are transmitted across multiple links to reach their destination. Internet Protocol ("IP") in the Transmission Control Protocol/Internet Protocol ("TCP/IP") suite is a network layer protocol.

The next layer, layer 4, is the transport layer 208. The transport layer 208 provides end-to-end accountability of data transmitted as streams of packets. The transport layer functions include monitoring data flow to ensure proper delivery of data between source and destination. It provides for error correction and for data fragmentation and reassembly. TCP is a network layer protocol.

The next layer up, layer 5, is the session layer 210. The session layer 210 provides for control and synchronization in exchanging data between users. For example, dialogues may be used for check and recovery of data transfer. The next layer up, layer 6, is the presentation layer 212. The presentation layer 212 functions include formatting data for display or presentation. In this layer, codes and encryption in data are interpreted and formatted for presentation. The next layer up, layer 7, is the application layer 214. This layer is responsible for supporting end-user applications such as file transfer, electronic message exchanges and terminal session.

Importantly, it should be understood that all levels of the above-described OSI layers are not necessarily present in all protocol stacks. That is, the OSI protocol stack is a reference model to provide standardized logical decomposition of network into layers for communications between systems. For example. TCP/IP does not have a complete level 4 in the protocol stack because IP does not guarantee delivery of data nor will it detect missing packets, although there is a reassembly in TCP/IP that serves a portion of the function typically found at level 4. Instead, for TCP/IP, reliable delivery is left up to the driving application at level 7. Thus, a keystroke stuffer is, effectively, simulation above level 7, the application layer of the protocol stack.

A "protocol exerciser" provides a somewhat more efficient method for producing load. This method involves simulation at level 7 of the protocol stack. This type of simulator will have knowledge of a particular application, for example, the File Transfer Protocol ("FTP"). This simulator will open ports directly with the system under test rather than having the client application do so and drive traffic to the system under test by conforming to the higher level protocol that is being tested, e.g., FTP, Hypertext Transfer Protocol ("HTTP"), Open Database Connectivity ("ODBC"), Simple Mail Transfer Protocol ("SMTP"), etc. The protocol exerciser provides an efficient way to generate load because all extraneous functions of the application such as redrawing screens, etc., do not need to be performed at the client. A significant drawback of this type of load generation, however, is that this simulator is protocol specific. If a new protocol is developed, a new load generator needs to be developed. For example, an SMTP traffic generator cannot be used to test the Internet Mail Access Protocol ("IMAP") even though both protocols are mail transfer protocols. Instead, it is necessary to develop an IMAP protocol tester.

Figure 3:
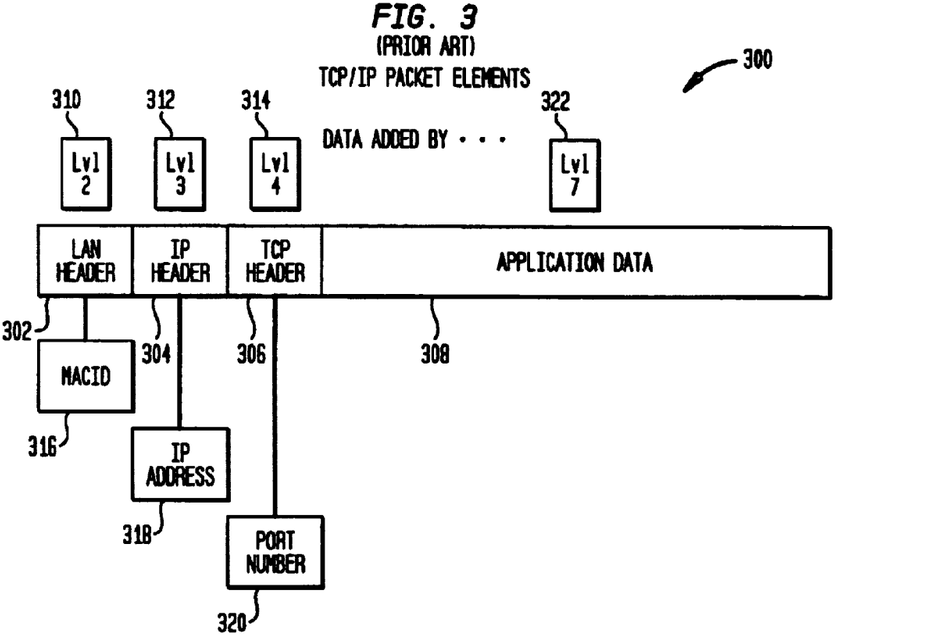
FIG. 3 is the layout of a TCP/IP packet.

The result of either of these methods is a series of packets that pass between the system under test (102 FIG. 1) and the driving system (104 FIG. 1). FIG. 3 is a layout of a packet for a Transmission Control Protocol/Internet Protocol ("TCP/IP") transmission. This packet includes a series of headers 302, 304, 306 that have been prepended to the data 308 that the application desires to send. FIG. 3 also indicates the level 310, 312, 314 in the protocol stack where the data is added to the packet and the address 316, 318, 320 that applies to each level. The application data 308 from layer 7 ia typically passed to the transport layer protocol, for example, the TCP. As shown in FIG. 3, TCP adds a header 306, and passes it to next layer protocol 312, for example, IP. IP also adds its header 304 and passes it to the layer 2 protocol 310 which also adds its header 302. As shown, layer 2 protocol may be Ethernet, Token Ring, FDDI LAN. The padded data is then passed to the physical layer where the data is converted into electrical signals and transmitted to the destination system to be received by the network interface card on the destination system. In sum, a request from a user traverses the OSI model until it is converted into network traffic. Once it reaches the destination system, it moves back up the OSI model so that a server application may interpret the request.

Figure 4:
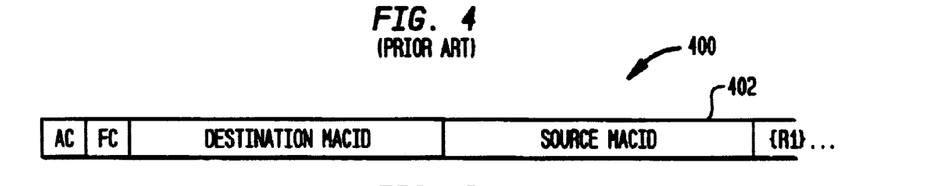
FIG. 4 shows the layout of the LAN header, 802.2 Token ring.

FIG. 4 shows the layout of the LAN header 400. This is an IEEE 802.2 header Token ring. The shaded "Source MACID" field 402 is the client address which is added at level 2. MACIDs are assigned by the manufacturer of the network interface card, and are unique to each card.

Figure 5:
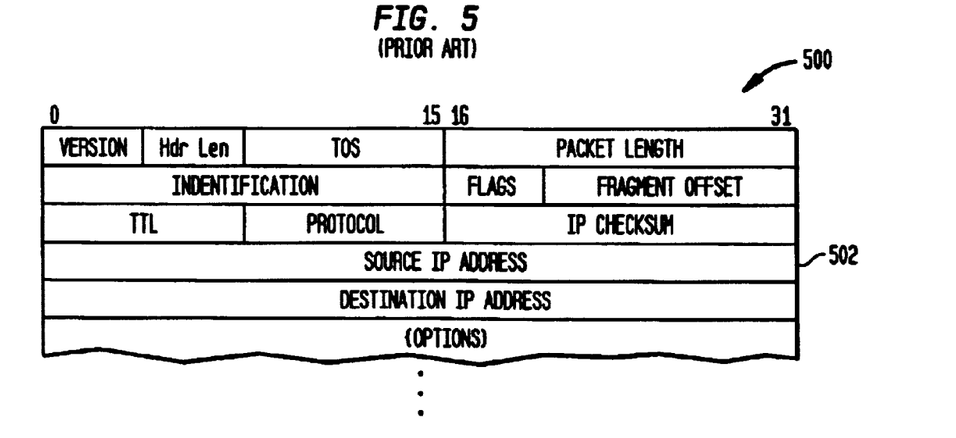
FIG. 5 shows the layout of the IP header.
Figure 6:
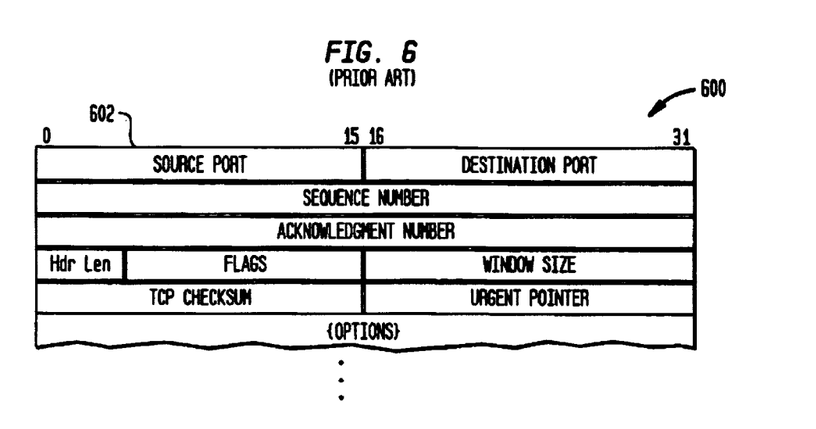
FIG. 6 shows the layout of the TCP header.

FIG. 5 shows the layout of the IP header 500. The shaded "Source IP address" field 502 is the client address which is added at level 3. FIG. 6 shows the layout of the TCP header. The shaded "Source Port" field 602 allows the receiving host to route the data field to a specific application running on that client. The header formats shown in FIGS. 4, 5, and 6 are well known to those skilled in the art of computer networking. Note that the port numbers are not client unique. That is, given a port number, it is not possible to identify the unique client to which that port number belongs. Instead, port numbers are used to distinguish between various users within the client. In contrast, the MACID and IP addresses are client unique. Given either a MACID or an IP address, a unique client can be determined. Given this overview, it is possible to examine the traffic flows resulting from simulators of the current art, to compare these flows with traffic that would result from an equal number of actual clients, and to compare and contrast how these flows would affect the system under test.

Figure 7:
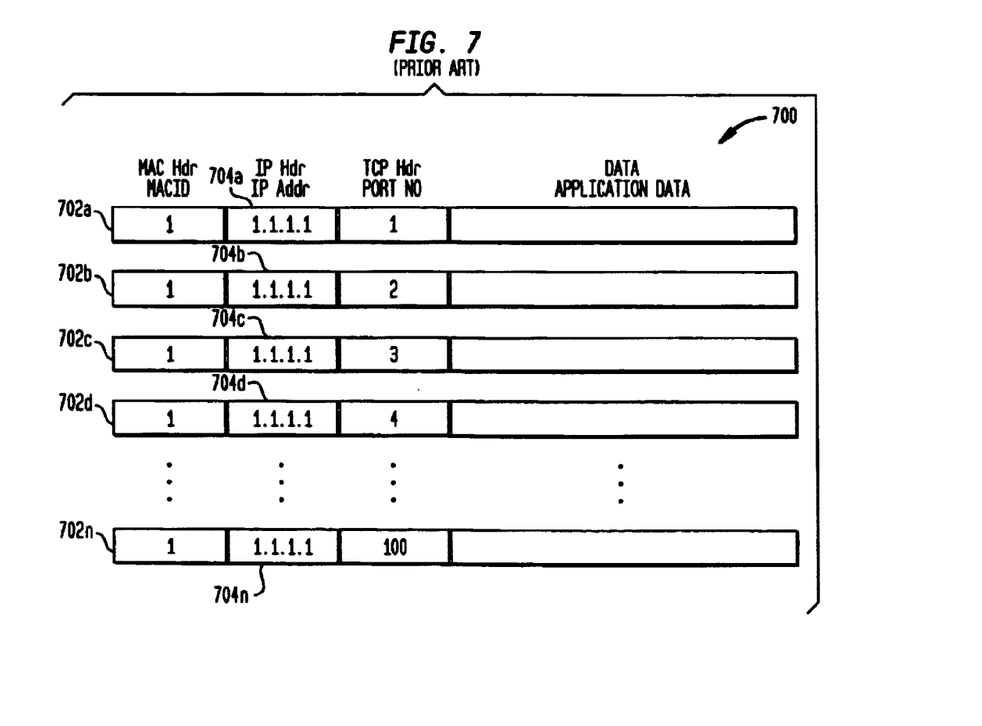
FIG. 7 shows packets from 100 simulated clients produced by a simulator of the current art.

The major difference between a prior art simulation tool and real client traffic is the degree of fidelity of the simulation. Generally, the phrase "test fidelity" refers to the property that a test properly exercises code paths, for example, to closely emulate the real runtime network load in a computer network. FIG. 7 shows a series of packets 700 that would originate from a prior art simulator where a single workstation was set up to simulate 100 clients. Generally, the prior art simulation method would open one hundred sessions with the system under test. This would result in one hundred packets being sent to the system under test. However, as illustrated in FIG. 7, the client specific addresses, MACID and IP address 702a. . . 702n, 704a. . . 704n, for each of these packets would all be identical. It is apparent to both the system under test and to anyone who might be tracing the traffic of these transactions that the test setup has a single workstation providing high volumes of traffic.

Figure 8:
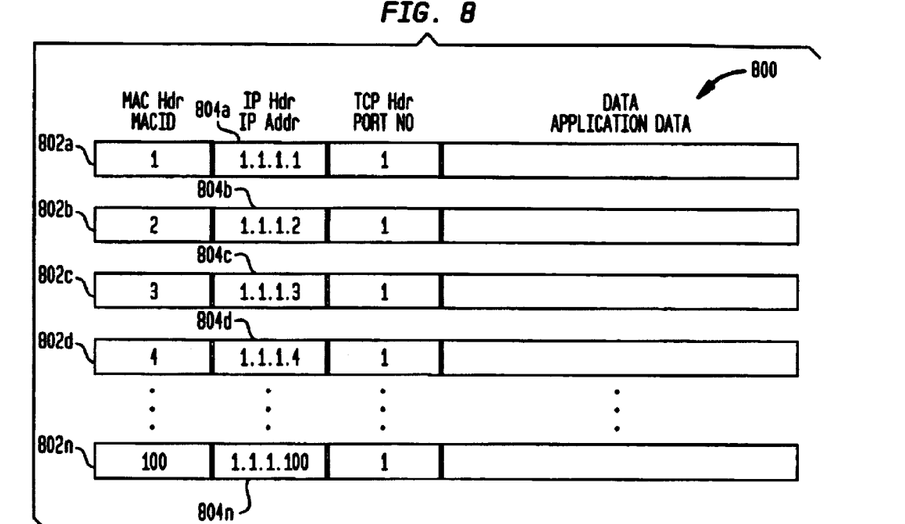
FIG. 8 shows packets from 100 real clients or from 100 clients simulated by this invention.

In contrast, FIG. 8 shows one hundred packets 800 produced by a real client set. Note that each packet has unique client-specific addresses for both the MACID and the IP address 802a. . . 802n, 804a. . . 804n. Thus, to the system under test, this appears to be one hundred clients, each with one application running. An example of how this departure from fidelity by the prior art simulators would be visible and how it would negatively impact the test that could be achieved is explained below.

Typically, the prior art simulators asserting that each driving workstation can simulate some number of client workstations do not physically emulate multiple number of different client workstations, but one client workstation. This can be verified by using a TCP/IP provided command. TCP/IP provides a simple command: "arp -a" which displays the Address Resolution Protocol ("ARP") table. ARP determines through the use of a broadcast message packet the MACID, a physical client address, that corresponds to a specific TCP/IP address, a protocol client address. This pair of addresses is then stored in the ARP table for future use to avoid future network traffic required for the discovery. There will be an entry in the ARP table for each workstation that communicates with a particular TCP/IP host. If this command were to be entered on the system under test, only a single entry would appear, i.e., that of the single workstation communicating with the server. In contrast, if one hundred real clients were present, the ARP table would have one hundred entries, one for each real client.

There are some cases where this distinction is not important. However, if, as an example, there were a bug in the ARP table handling code that only allowed 50 clients to be maintained, then the above test would certify this code as being good up to 100 clients while, once the code was released to customers and actually had to support 100 clients, the bug would become apparent and the code would fail. More insidiously, it would appear that the code had not been tested since the error would appear very quickly in the real environment. Thus, the example test provided by the prior art simulators provides flawed test emulation because it does not provide a realistic testing environment.

Moreover, the test is flawed because the tool used to drive the test does not provide high fidelity to the real-client environment. Specifically, the prior art simulator does not exercise all possible paths in the code implementing the system under test that the real client set exercises.

An additional disadvantage concerns the network traffic. In the above case, the ARP table is populated with the single entry for a driving workstation. This ARP table population requires a flow of data on the network. The result of this flow yields the ARP table entry. In a real configuration, however, there would have to be multiple flows of network information, one to each of the real clients. Thus, in the prior art simulated environment, ARP would be under represented in the network traffic flows. This would be doubly true as ARP tables have a specific size and entries tend to fall out of this table as they age. In the prior art simulated scenario, this would never occur as traffic for multiple clients is flowing to the single real workstation. In a real environment, this would happen all the time. Thus, once again, the network load simulated under the prior art simulation is different than it is in production. This, once again, leaves code paths that are either not tested at all or that are under tested in the prior art simulated environment and any flaws in these code paths can and will cause failures in production that will not show up in test.

Figure 9:
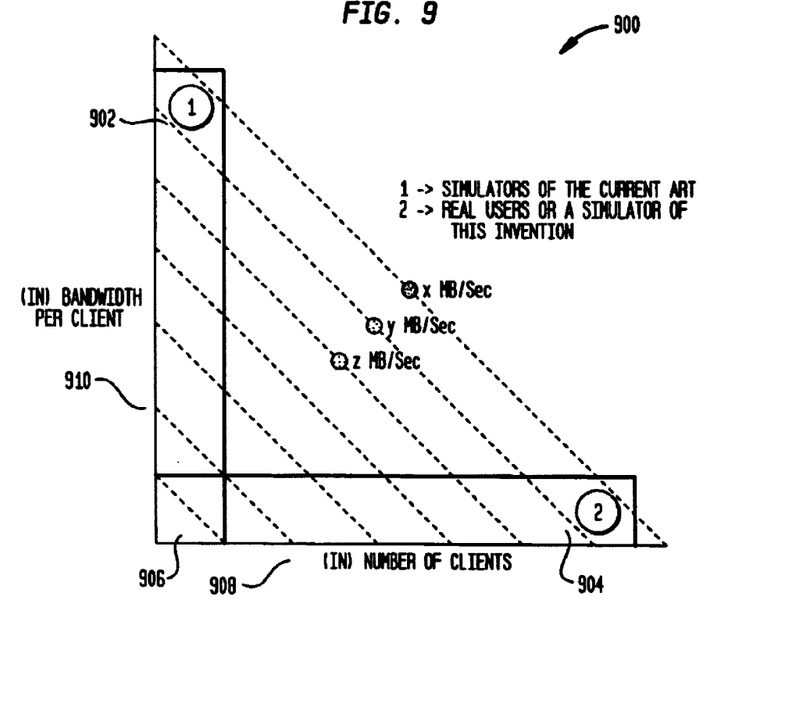
FIG. 9 shows a graph of two distinct methods of operation for reaching a desired aggregate bandwidth at the system under test.

The scenarios where the above-described failures occur can be generalized. Specifically, if the code being tested incurs any per-client costs and/or maintains state information on a per-client basis, then high fidelity testing is required if the code paths that support those per-client items are to be sufficiently tested. FIG. 9 illustrates this concept. The prior art simulators operate in area 1 902 providing a small number of clients each of which produces a high bandwidth. Real clients, on the other hand, operate in the mirror reverse. Real clients operate in area 2 904, i.e., a large number of clients each of which produces a relatively small bandwidth of data. Thus, while a simulator in the prior art provides the total aggregate bandwidth required by the system under test, the type of this bandwidth is incorrect in that it does not represent a correct number of clients. Testing which has this flaw will show the characteristic that in-lab testing will complete without error but, upon experiencing load in a production environment, the server will fail.

Generally, the above described behavior is prominent in the services that are provided on the Internet today. Referring back to FIG. 9, if the number of clients is small, areas 1 902 and 2 904 overlap as shown at 906. Thus, either sort of test may be sufficient. However, as the total bandwidth grows, it is extremely important to ensure that the testing adjusts to the growth correctly. As an example, it is clear that if a company production level doubles in size it is unrealistic to expect that each worker suddenly doubles their workload. Instead, it is more reasonable to expect that the number of workers doubles. Thus, growth typically occurs along the "X" axis 908 of the graph in FIG. 9 rather than along the "Y" axis 910. That is, as Internet usage grows, areas 1 902 and 2 904 become increasingly distant from one another. This distance represents potential failures that cannot be detected by the existing prior art simulators.

The prior art simulators generally run on the machine types that they are simulating. i.e. if an Intel 80×86 machine is being simulated, the simulation generally runs on an 80×86 machine. If an IBM S/390 machine is being simulated, the simulator generally runs on a S/390 machine. This is true because current art simulators depend upon either the applications being run in the simulated platform and/or on the client protocol stack of the simulated platform.

Considering the foregoing, it is highly desirable to have a network simulator that is able to emulate more realistic client/server network traffic and load for testing a system under test. Particularly, it is highly desirable to have a network simulation system that is able to emulate realistically large number of clients. It is also highly desirable to have this simulation system to run on any computer system, independent of specific architecture.

SUMMARY OF THE INVENTION

The invention described herein is a method for providing high fidelity simulation of clients generating traffic to and accepting traffic from a system under test. Both generating and accepting traffic occur at level 2 of the protocol stack. Thus, a simulator utilizing the method of the present invention directly connects to the physical device that communicates with the system under test. For example, if the simulator is running on an intelligent work station, then this device is a LAN card. If the simulator is running on a mainframe, the device is a communications device. If the simulator is running on the system under test, it is be possible to deliver the traffic to the native protocol stack of the system under test via an internal input/output ("I/O") buffer using an I/O simulation techniques.

In addition to managing the physical transmissions of data, the simulator of the present invention also provides for generation of complete data packets that are client specific. Moreover, in generating complete data packets, the present invention manages the client specific data areas in the packets. The client specific data areas include application specific content data. For example, the simulator of the present invention inserts client specific addresses at levels 2 and 3 of the protocol stack and manages port and/or session numbers at level 5. Furthermore, the simulator of the present invention handles the traffic flow that is needed to maintain the conversation, for example, pacing, window control, and ARP replies, because simply "tracing" and "replaying" frames is not sufficient to emulate a real run time environment.

Further yet, the present invention provides for customization of data content on a per-client basis to maintain high fidelity in simulation. A simulator needs to be able to incorporate information returned from the system under test into subsequent frames. For example, tree identifiers ("TIDs") and file identifiers ("FIDs") typically identify pieces of information that the Network Basic Input Output System ("NETBIOS") uses to associate open files in the Server Message Block ("SMB") protocol.

These pieces of information are client specific and will change from run to run. Thus, in simulation, a simple replay of previously observed traffic will not suffice to emulate real run time environment. These pieces of information are used in subsequent client requests. Therefore, the simulator needs to capture these pieces of information from a current request and then be able to substitute this information into future requests. The simulator of the present invention is enabled to capture the information from a current request for further user.

The present invention provides for simulated clients which are able to emulate the real run time environment as much as possible by having the client traverse various code paths which may occur during the run time. For example, the present invention provides for realistic simulation of clients where the clients may time out due to inactivity or idling. For example, in real run time environment, many clients idle for a duration longer than a predetermined amount of time. When such idling is detected, network servers typically designate these client as having timed out, and automatically terminate the network connection with the client. Such timing out, in turn may trigger ARP table timeout algorithms. However, in the prior art simulators, the simulated clients tend to be constantly active. As a result of this heavy activity, the time out feature may never get invoked. To overcome such shortcomings of the prior art simulators, the present invention provides simulated clients that can also emulate code paths of inactive clients.

In accordance with the goals to maintain high fidelity in simulating intelligent workstations, there is provided a simulator emulating clients at the lowest possible level where the client has a unique identity. By enabling simulation of clients each having a unique identity, it is possible to provide a simulation that is indistinguishable from real client traffic. With this capability, it is possible to construct tests that provide complete coverage of the system under test both in the software and in the hardware. Moreover, given the low level of the stimulation, tests can be constructed that inject errors at any level of the protocol stack.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

The present invention is directed to one component of a generalized client/server network simulation tool that simulates network traffic that is indistinguishable from the traffic that results from configuring a like number of real clients. The simulation tool may be employed to test host, for example, S/390 based network serving software and hardware. However, because of the generalized nature of the simulation, the scope of this tool is not limited to host testing nor to software testing. Moreover, the simulation tool of the present invention may be utilized to test the network fabric, i.e., the physical layer of the protocol stack.

To accomplish the foregoing high level of simulation fidelity, that is, a simulation closely resembling real client network paths, the network simulation tool includes: 1) simulation at level 2 in the protocol stack; 2) simulation that builds complete LAN frames; and 3) simulation that is enabled to insert and retrieve traffic for multiple clients. Each of the three components will be described briefly hereinbelow. The present invention is directed to the first component of the simulation tool, that is, the simulation at level 2 in the protocol stack.

1) Simulation at Level 2 in the Protocol Stack

In a typical network computing environment, each client is equipped with an identifier unique to the client. This identity is unique down through level 2, the media access control or MAC layer, a part of the data link layer. Specifically, each client has a unique MACID, the address that the client's LAN card recognizes in order to capture physical traffic from the LAN. To correctly simulate the real computer networking environment, the present invention provides simulated clients having unique identities at level 2.

Alternatively, each client also has a unique identity at level 3, the network layer of the protocol stack. Specifically, for TCP/IP, this is the IP address for the client. Furthermore, some applications tend to receive traffic at different levels depending upon their scope. For instance, Lotus Notes, which primarily serves users that are local to the enterprise and, thus, local to the LAN, tends to receive traffic at level 2. Each LAN frame will have a unique MACID and a unique TCP/IP address that corresponds to the MACID. Other applications, such as Web servers, primarily serve users that are foreign to the enterprise, and thus, not attached to the LAN but who have come into the LAN through a router attached to a wide area network. These servers tend to receive traffic at level 3, i.e., each LAN frame has a unique TCP/IP address that corresponds to the client but the MACID is the same in all of the frames, the MACID of the router.

To provide high fidelity simulation, this component of the simulation tool of the present invention provides a simulator that operates at level 2. This simulates locally attached clients. By removing some of this generality, i.e., by setting duplicate MACIDs, simulation at level 3 can be achieved. This simulates remotely attached clients.

2) Simulation Generating Complete LAN Frames

This component relates to the generation of LAN frames for the simulated clients. Level 2 is where the complete LAN frame is built just prior to transmission on the physical LAN which is level 1. Because the client identity reaches level 2 in the protocol stack, any simulator that demonstrates a high degree of fidelity must be able to generate complete LAN frames. That is, knowledge of which specific client is being simulated must pervade the protocol stack through level 2, the building of the LAN frame. A serving entity is a finite state machine, i.e., a complete transaction usually takes more than one communication. For example, in a home shopping transaction, multiple communications related to a purchase takes place between a client and the server. Building the LAN frames at level 2 enables simulation of actions of the application that would be running on the simulated client maintaining the client portion of this finite state machine. Furthermore, building LAN frames at level 2 allows retrieval and manipulation of the contents of each reply from the server as state information, thereby enabling full checking of responses from the host.

3) Simulation That Inserts and Retrieves Traffic for Multiple Clients

Once the LAN frames are generated as described above, the frames need to be inserted on the LAN. That is, the LAN frames built at level 2 now enters level 1, the physical protocol stack for transmission. Since the LAN cards generally do not check to ensure that the addresses supplied in LAN frames that are to be inserted onto the LAN are correct, it is possible to generate traffic for multiple clients and send it out. At other levels, such insertion is called "spoofing", i.e., pretending to be someone else. However, the real problem arises when the server returns traffic to the simulated client. The LAN card only recognizes traffic specifically for the client identity that has been specified to the card. Thus, in normal circumstances, traffic for multiple clients goes out but cannot come back in.

To circumvent this problem, this component of the simulation tool provides novel methods to be employed. These methods may be architectural specific, for example, specific to token ring, or Ethernet. Moreover, they also may be generalized to cover all LAN types.

In multi-cast architecture, a LAN card may receive traffic for multiple destinations. However, multi-cast architecture does not allow individual clients to be simulated, i.e., a multicast address represents a class of clients, and not a specific client in the class. Although there is a facility known as "virtual IP address" or VIP that allows one real client to have multiple identities, this facility functions at level 3, and therefore does not allow the full simulation fidelity that is required.

The first component of the network simulation tool provides for the simulation at level 2, the data link layer in the protocol stack. Briefly, the data link layer defines the rules for sending and receiving information across a physical connection between two systems. Functions of the data link layer include dividing the data from the upper network layer into frames and sending the frames across the physical link. Data is framed so it can be transmitted one frame at a time. The data link layer in the receiving system will accept those frames, passing them to higher levels of the protocols. Thus, the data link layer is responsible for the transfer of data over a physical channel.

Because level 2 defines the software/hardware boundary in any given protocol stack, the simulation tool of the present invention does not require the presence of any specific protocols. Moreover, the present invention does not specify that the protocol stack simulated be TCP/IP. Thus, the present invention may encompass any protocol stack that is in existence today or any protocol stack that may be invented in the future, affording tremendous degree of extensibility which can cover new developments in the field of inter-system communications and networking. Additionally, the present invention is independent from the specification of the level 1 protocol, the physical layer, which is not a part of this invention. Consequently, the present invention can be applied to any communications type including local area network ("LAN"), wide area network ("WAN"), or any new communications protocol or architecture that may emerge, further providing the extensibility of the present invention to any communications method.

Figure 10:
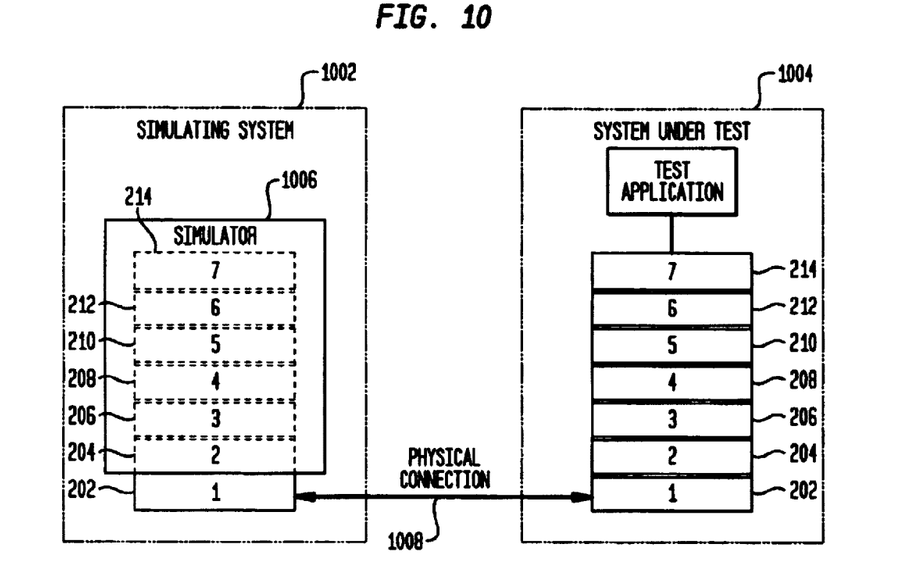
FIG. 10 illustrates a simulator of the present invention that virtualizes clients at level 2 in the protocol stack.

FIG. 10 illustrates a simulator 1006 that virtualizes clients at level 2 204 in the protocol stack. The mechanism of the simulator 1006 encompasses all of the functions of the protocol stack and produces fully formed packets which are delivered to the communications medium 1008. These packets then flow normally through the protocol stack on the system under test 1004 and replies are returned to the simulator 1006. The simulator 1006 captures and interprets these replies and takes appropriate actions. For example, opening a TCP/IP socket involves three packet transmissions, client to server, server to client and client to host. The initial client request flows to the server, the server sends information to the client, which is captured by the client and used to formulate a final acknowledgment from the client to the server. Because the simulator 1006 has control through level 2 (204) of the stack, the client specific addresses that are set at levels 2 and 3 (204 and 206) are under the control of the simulator 1006. In this way, the virtualization of the clients is complete and the resulting packets are indistinguishable from packets flowing from a number of distinct clients.

Figure 11:
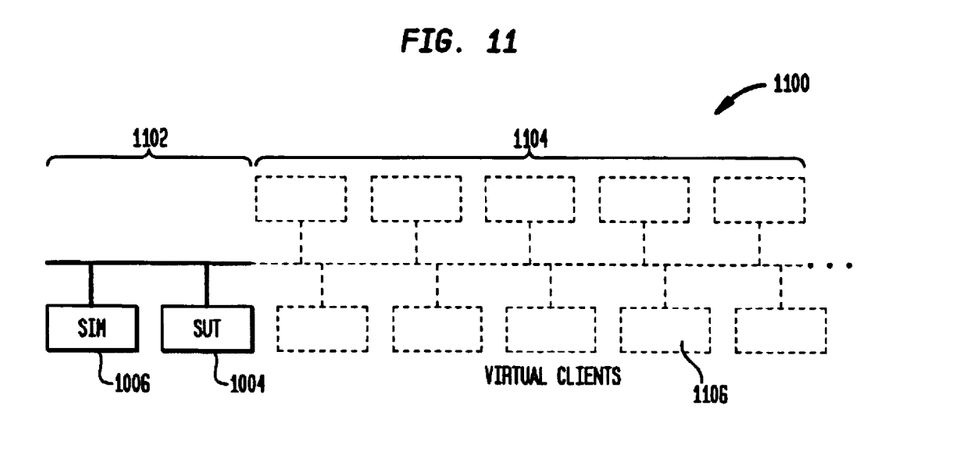
FIG. 11 is a diagram illustrating the simulator of present invention.

FIG. 11 shows the physical configuration 1100 of the simulation system of the present invention both as it actually exists, shown by the solid lines 1102, and as it appears to the system under test 1004 shown by the dashed lines 1104. Because the traffic flowing is indistinguishable from traffic that is generated by multiple clients and because the only knowledge that the system under test 1004 has of clients is their traffic, the testing system appears to the system under test 1004 to be composed of multiple real clients 1106. In fact, these clients 1106 are virtualized.

Figure 12:
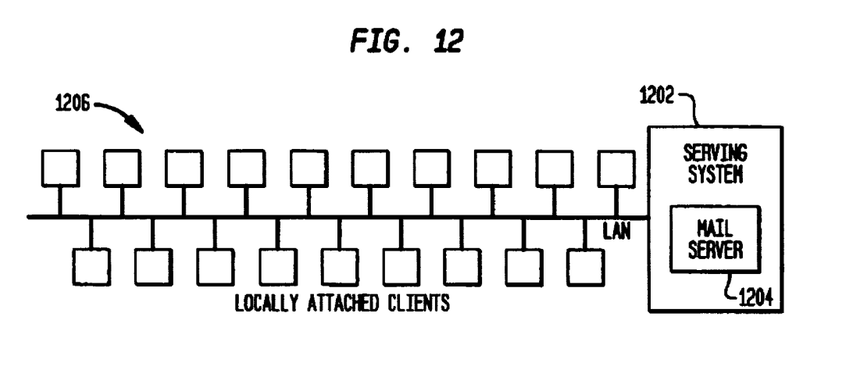
FIG. 12 shows a typical application serving locally attached clients.
Figure 13:
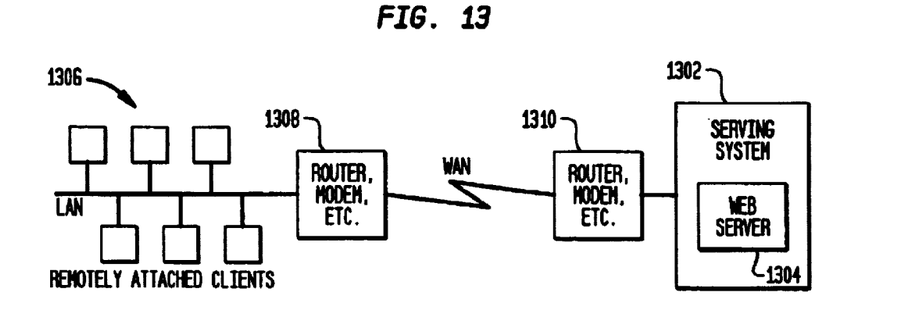
FIG. 13 shows a typical application serving remotely attached clients.

By providing the ability to simulate at level 2 of a protocol stack, the present invention also enables the ability to simulate at higher levels if desirable. Most significantly, being able to simulate at level 2 allows simulation at level 3. FIGS. 12 and 13 illustrate the difference between locally attached and remotely attached workstations. FIG. 12 shows a typical application 1204 serving locally attached clients 1206. FIG. 13 shows a typical application 1304 serving remotely attached clients 1306. Different serving applications have different client sets that are predominantly one of these two types. As an example, a mail serving application 1204 will mostly serve locally attached clients 1206, for example, the employees of the enterprise hosting the mail application. On the other hand, web serving applications 1304 will mostly serve remote clients 1306 arriving from the Internet via a level 3 router 1308, 1310. Examples of remote clients 1306 include users outside the company making inquiries of the company. Thus, for some applications like the mail server 1204 shown in FIG. 12, simulation at level 2 may be the most desirable. For other applications like the web server 1304 shown in FIG. 13, simulation at level 3 will be the norm.

Generally, because the simulation of the present invention is driven at level 2 of the protocol stack, it is not necessary that the specific architecture of the system where the simulator is running bears any relationship to the architecture of the system under test. Because the simulator of present invention conforms to the level 2 protocol being simulated, there is no required relationship between the architecture of the machine driving the test and that of the system being tested. Indeed, serving systems are unaware of and unconcerned about the specific architecture of the systems being served. Thus, an additional advantage of the present invention is that the simulating machines can be chosen strictly on the merits and/or requirements of that machine regardless of the architecture of the machine under test. This implies an ability to scale and an extensibility that does not exist in simulators of the prior art.

The present invention may be embodied in a number of ways. In the first embodiment, the present invention may be in a form of a program running on an intelligent workstation. In the second embodiment, the present invention may include a program running on a mainframe. A third embodiment may include a hardware having intelligence to sustain the per-client data items that need to be inserted in the frames produced.

In the present invention all embodiments of this invention conform to existing standards on two points. First, all the embodiments utilize a communications device that conforms to the one used by the system under test. For example, if the system under test uses LAN type or WAN protocols, the embodiment needs to conform to the LAN type used or the Wan protocols used. Second, all embodiments produce frames that conform to the protocol stack used by the system under test, e.g., TCP/IP, NETBIOS, SNA, IPX, etc. Furthermore, all embodiments of this invention generate protocol/communications medium conforming data packets and insert these packets onto the communications medium. Likewise, all embodiments provide a method for retrieving packets returned from the target system and filtering these packets to the set that are targeted to the simulated clients. All embodiments further provide the ability to capture information returned from the system under test for usage in subsequent frames.

The present invention in all its embodiments provides definition of client-specific addresses so that a plurality of clients can be simulated. Each simulated client has an individual client address at each relevant level of the protocol stack. Moreover, in the present invention conversation between each simulated client and the system under test is maintained. For example, for TCP/IP, the simulator of the present invention responds to an ARP from the system under test for each simulated client, and maintains an ARP cache for each simulated client, and any other client specific cache such as a domain name server ("DNS") for each client. These caches are maintained independently for each client.

As another TCP/IP example, the present invention opens and maintains ports for individual clients independent of any other simulated clients. Thus, within the simulated protocol stack, a client identity is maintained through the simulation, i.e., when the simulated protocol stack is running, it is doing so on behalf of a specific client. Furthermore, the state of any individual simulated client is maintained as independent state from any other simulated clients.

Importantly, the present invention does not simply simulate the functions of the protocol stack. Between the client user and the client protocol stack sits the client application. This application maintains the state functions with the system under test. For example, when retrieving a web page, the web browser opens a socket, sends the request, then receives data until the other side closes the connection. The specific format of the data sent both ways is dictated by the HTTP protocol. This is an application level protocol that is supported by the web browser. To the protocol stack per se it is just data. The simulator of the present invention maintains the state of this conversation independently for each of the simulated clients. In addition, the simulator captures information returned from the system under test, such as tokens and session keys, for use in later transmissions. This is accomplished by allowing driving scripts to parse incoming messages and store the information thus parsed in client state variables. Subsequent transmissions can include the contents of client state variables in the requests, thus sustaining the client/host state machine.

Furthermore, the simulator of the present invention provides a driver for emulating the user of the client, i.e., the user actions. This driver may be a script having instructions of user actions static or dynamically loaded as an input to the simulator. Alternatively, this driver may be an operator at a workstation feeding user action instructions to the simulator.

Figure 14:
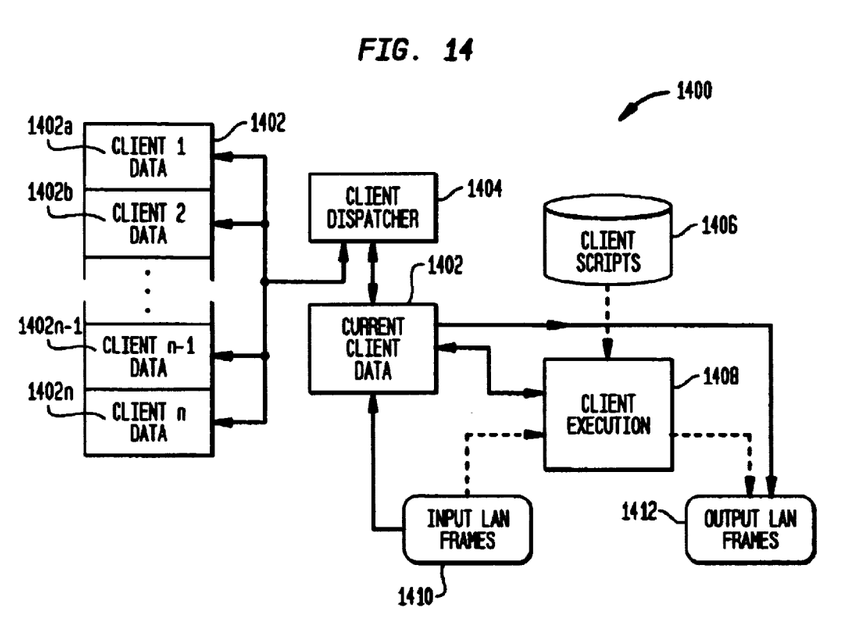
FIG. 14 shows how a simulator of the present invention maintains independent states for simulated clients.

FIG. 14 shows how the simulator of the present invention maintains independent states for simulated clients. The maintenance of unique client states for each simulated client allows high fidelity simulation desired for complete client/server testing, especially when the server seeks to establish a finite state machine with the client so that the progress of a transaction between the client and the server can be maintained. For example, in a shopping session, items are selected and added to a "shopping cart". When the shopper is satisfied with the shopper's purchases, the shopper proceeds to a "checkout" function. This function knows all of the items that are in the shopping cart which allows this function to build a bill of sale. There are well established mechanisms for doing these functions. Any simulator that wishes to provide high fidelity testing must provide facilities for supporting these state maintaining mechanisms. Furthermore, pieces of state information exist at all levels in the protocol stack. That is, the client MACID exists at level 2, the client IP address exists at level 3, the TCP/IP port number exists at level 4. The above-described example describes HTTP cookies which exist at level 7 in the protocol stack, i.e., the application level. All of these pieces of information are client specific and they must be maintained separately and independently for each simulated client.

FIG. 14 illustrates how this is accomplished. Various data items are defined for each simulated client. Some of these may exist in all of the clients (e.g. the IP address and the MACID) while some may only exist for certain clients, e.g., cookies for a particular transaction type. A generalized facility called a symbol table 1402 (or some similar mechanism) is provided for use by the simulator of the present invention. Client state data is maintained in the symbol table for each individual client 1402a, ..., 1402n–1, ..., 1402n. The simulator can retrieve data 1402 via the client dispatcher 1404 from the symbol table for each client 1408 and insert the data into requests, i.e., output LAN frames 1412, flowing from the simulated client to the server. Client scripts 1406 are provided to parse incoming messages, i.e., input LAN frames 1410, retrieve data items from the messages, and store them in the symbol table 1402. Therefore, data items returned by the server to indicate state (e.g., cookies) can be returned to the server in subsequent requests, thereby maintaining the aforementioned state machine.

Because of the generalized nature of this mechanism, there are a number of other uses that can accomplished. Specifically, if tracing of a particular client is desired, it would be possible to provide this capability on a client-by-client basis. If client specific statistics, such as, response time or transaction profiling were required, these statistics could be accumulated and displayed using the same mechanism. This mechanism not only provides a high degree of fidelity to real clients, which must also maintain such state information, but also provides a high degree of control over the actions of the individual clients. That is, the piece of state information that is maintained contains the current place where a client is executing in a script that represents the various user actions. Because these states are independent of one another, each of the simulated clients can be executing different actions, i.e., mimicking the behavior of real clients.

This accomplishes the objective of the present invention of providing a high fidelity simulation.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for providing a high fidelity simulation of a client/server system including a server and intelligent client workstations, the method comprising:

simulating at level 2 of a protocol stack by formulating client requests having unique client identifiers at the level 2 of the protocol stack;

transmitting the client requests on a communications channel having routing access to the server for servicing the client requests;

the step of simulating at level 2 of the protocol stack further comprising:

formulating data to emulate the client requests to submit to the server;

padding the formulated data with header data that conforms to a communications protocol used by the server in receiving the client requests; and for each respective client request, producing at least one level 2 data frame from the padded data by inserting the unique client address into the padded data, the unique client address representing a respective one of the client workstations that submitted the respective client request.

2. The method of claim 1, further comprising:

simulating at level 3 of the protocol stack by formulating the client requests with unique client identifiers at the level 3 of the protocol stack before transmitting the client requests.

3. The method of claim 1, further comprising:

maintaining independent client states for each client request submitted by the respective client workstations.

4. The method of as claimed in claim 3, wherein the step of maintaining independent client states further includes:

emulating a client in an idle state to trigger a timeout event.

5. The method of claim 1, further comprising:

incorporating static instructions that emulate user actions; and formulating data to emulate the client requests to submit to the server in response to the incorporated static instructions.

6. The method of claim 1, further comprising:

dynamically loading instructions that emulate user actions; and formulating data to emulate the client requests to submit to the server in response to the dynamically loaded instructions.

7. The method of claim 1, further comprising:

receiving operator inputs at the workstations; and formulating data to emulate the client requests to submit to the server in response to the received operator inputs.

8. The method as claimed in claim 1, wherein:

the communications channel comprises at least one of includes a local area network (LAN), physical communications device, and input/output buffer internal to the server.

9. The method as claimed in claim 2, wherein the step of simulating at level 3 of the protocol stack includes:

formulating data to emulate the client requests to submit to the server;

padding the formulated data with header data that conforms to communications protocol used by the server in receiving the client requests; and for each respective client request, producing at least one level 3 data frame from the padded data by inserting a unique client address and a network address associated with the unique client address into the padded data, the unique client address representing a respective one of the client workstations submitted the respective client request.

10. A program storage device readable by machine, tangibly embodying a program of instructions executable by the machine, when the instructions are executed on the machine performs the method steps of providing a high fidelity simulation of a client/server system including a server and intelligent client workstations, the method steps comprising:

simulating at level 2 of a protocol stack by formulating client requests having unique client identifiers at the level 2 of the protocol stack;

transmitting the client requests on a communications channel having routing access to the server for servicing the client requests;

the step of simulating at level 2 of the protocol stack further comprising:

formulating data to emulate the client requests to submit to the server;

padding the formulated data with header data that conforms to a communications Protocol used by the server in receiving the client requests; and for each respective client request, producing at least one level 2 data frame from the padded data by inserting the unique client address into the added data, the unique client address representing a respective one of the client workstations that submitted the respective client request.

11. The program storage device of claim 10, wherein the method steps further comprise:

simulating at level 3 of the protocol stack by formulating the client requests to have unique client identifiers at the level 3 of the protocol stack before transmitting the client requests.

12. The method of claim 1, wherein:

the unique client identifiers at the level 2 of the protocol stack comprises media access control (MAC) identifiers.

13. The method of claim 1, wherein:

the level 2 comprises a data link layer of the protocol stack.

14. The method of claim 2, wherein:

the unique client identifier at the level 3 of the protocol stack comprises an Internet Protocol (IP) address.

15. The method of claim 2, wherein:

the level 3 comprises a network layer of the protocol stack.

16. An apparatus for providing a high fidelity simulation of a client/server system including a server and intelligent client workstations, the apparatus comprising:

means for simulating at level 2 of a protocol stack by formulating client requests having unique client identifiers at the level 2 of the protocol stack;

means for transmitting the client requests on a communications channel having a routing access to the server for servicing the client requests;

means for formulating data to emulate the client requests to submit to the server;

means for padding the formulated-data with header data that conforms to a communications protocol used by the server in receiving the client requests; and means for producing at least one level 2 data frame, for each respective client request, from the padded data by inserting the unique client address into the padded data, the unique client address representing a respective one of the client workstations that submit the respective client request.

\* \* \* \* \*